United States Patent
Sorg (10) Patent No.: US 9,874,310 B2
(45) Date of Patent: Jan. 23, 2018

(54) GREASE GUN CARTRIDGE CONSTRUCTION

(71) Applicant: GREE-SEE Technology, LLC, Johnson City, TN (US)

(72) Inventor: Daniel Mark Sorg, Elizabethton, TN (US)

( * ) Notice: Subject to any disclaimer, the term of this patent is extended or adjusted under 35 U.S.C. 154(b) by 0 days.

(21) Appl. No.: 14/997,073

(22) Filed: Jan. 15, 2016

(65) Prior Publication Data

US 2017/0205028 A1    Jul. 20, 2017

(51) Int. Cl.
| | | |
|---|---|---|
| B65D 88/54 | (2006.01) | |
| F16N 37/02 | (2006.01) | |
| B05C 17/005 | (2006.01) | |
| F16N 3/12 | (2006.01) | |

(52) U.S. Cl.
CPC ........ *F16N 37/02* (2013.01); *B05C 17/00576* (2013.01); *B05C 17/00596* (2013.01); *F16N 3/12* (2013.01)

(58) Field of Classification Search
CPC ... F16N 37/02; F16N 3/12; F16N 5/00; B05C 17/00576; B05C 17/00596
USPC ......................................................... 222/326
See application file for complete search history.

(56) References Cited

U.S. PATENT DOCUMENTS

| | | | |
|---|---|---|---|
| 1,349,994 A | | 8/1920 | Wood |
| 1,368,840 A | | 2/1921 | Rischard |
| 1,718,985 A | * | 7/1929 | Scoville .................. F16N 37/02 184/28 |
| 1,833,528 A | | 11/1931 | Linton |
| 1,905,913 A | * | 4/1933 | Kopp ........................ F16N 3/12 222/262 |
| 1,926,398 A | * | 9/1933 | Nielsen ..................... F16N 3/12 222/262 |
| 1,945,813 A | | 6/1934 | Johnson |
| 2,275,108 A | * | 3/1942 | Levanas ..................... F16N 3/12 222/256 |
| 2,759,640 A | | 8/1956 | Deupree |
| 2,915,226 A | * | 12/1959 | Sundholm ................. F16N 3/12 222/256 |
| 2,978,151 A | * | 4/1961 | Sundholm ................. F16N 3/12 141/27 |
| 3,338,478 A | | 8/1967 | Hedblad |
| 3,344,084 A | | 9/1967 | Leland |
| 3,393,840 A | * | 7/1968 | Sundholm ................. F16N 3/12 222/256 |
| 4,185,756 A | * | 1/1980 | Sciamonte ........... B65D 51/243 222/267 |
| 4,601,412 A | | 7/1986 | Martin |
| 4,664,298 A | * | 5/1987 | Shew ........................ F16N 3/12 184/105.2 |

(Continued)

*Primary Examiner* — Benjamin R Shaw
(74) *Attorney, Agent, or Firm* — Matthew M. Googe; Robinson IP Law, PLLC (57) ABSTRACT

A grease gun cylinder walled cartridge adapted for direct attachment to any of a variety of grease gun head constructions and grease pumping systems, wherein the cartridge wall can be of any color or completely clear and see through, wherein the grease column within the cartridge is pressured toward and through an inlet port in the gun head, which port opens on the section stroke of a piston mounted in said cylinder into a loading portion of a cylinder of the grease pumping system, and wherein the grease column pressuring means is ambient air pressure.

15 Claims, 11 Drawing Sheets

(56) References Cited

U.S. PATENT DOCUMENTS

| | | | | |
|---|---|---|---|---|
| 6,068,164 | A | * | 5/2000 | Totaro .................... F16N 3/12 222/389 |
| 6,135,327 | A | | 10/2000 | Post et al. |
| 6,164,561 | A | * | 12/2000 | Yoshida ................ B05B 3/10 222/148 |
| 6,467,579 | B1 | * | 10/2002 | Simon .................... F16N 3/12 184/105.2 |
| 6,616,067 | B1 | * | 9/2003 | Hunter ............... B05B 9/0822 222/209 |
| 2003/0183634 | A1 | * | 10/2003 | Cousseau ........... B65D 17/163 220/270 |
| 2005/0103808 | A1 | * | 5/2005 | Zschiedrich ........... F16B 47/00 222/326 |
| 2010/0116850 | A1 | * | 5/2010 | Weems .................. F16N 3/12 222/256 |
| 2010/0294808 | A1 | * | 11/2010 | He ......................... F16N 3/12 222/256 |

\* cited by examiner

GREASE GUN CARTRIDGE CONSTRUCTION

FIELD

The present invention resides in the structure of a grease gun cartridge adapted for use on a grease gun having any of a wide variety of grease gun pump constructions, typical of which pump constructions are shown in the drawings herein and in U.S. Pat. Nos. 3,338,478; 3,344,084; 2,978,151; 1,368,840; 1,349,994; and 4,601,412, the disclosures of which are hereby incorporated herein by reference in their entireties.

The typical mechanism in the gun head for operating these prior grease gun pumps consists of a grease loading and ejection cylinder in which a piston is slidably mounted for reciprocation between a grease loading stroke and a grease pressurizing (ejection) stroke, back and forth across a grease inlet port on the gun head, which port is in communication with the grease loading and ejection cylinder in the head. The inlet port is also in communication with a grease reservoir (cartridge) positioned in a metal barrel which is affixed to the gun head. In these mechanisms the grease in the loading operation is pressurized by a cartridge piston, a cartridge piston cocking rod, and a compression spring means having one end bearing against the lower inner end of the barrel (not shown) and having its other end bearing against the lower end of the piston within the filled cartridge and pressurizing the grease column within the cartridge toward and through the inlet port and into the grease loading cylinder. The piston in the gun head closes off the inlet port on its pressurizing (ejection) stroke and forces the grease, which was forced into the loading and ejection cylinder through the inlet port on the piston suction stroke by means of the cartridge spring, out of the gun head on the ejection (pressurizing stroke) and through a hose to a ZERK or equivalent fitting. One-way valving opens the loading and ejection cylinder to the hose on the piston ejection stroke and closes off the cylinder to the hose on the ejection piston suction stroke. Hand operated lever means or dual handle means operates the back and forth reciprocating action of the piston.

SUMMARY OF THE INVENTION

A grease in cylindrically walled cartridge adapted for direct attachment to any of a variety of grease gun head constructions having any of a variety of grease pumping systems, wherein the cartridge wall can be of any color or completely clear and see through, wherein the grease column within the cartridge is pressured toward and through an inlet port in the gun head, which port opens on the suction stroke of a piston mounted in said cylinder into a loading portion of a cylinder of the grease pumping system, and wherein the grease column pressuring means comprises ambient air pressure impinging on the bottom surface of a grease column.

It is particularly noted that in the above recited cartridge structure there is no metal barrel for containing the cartridge, no spring urged piston, no grease pressurizing spring, and no piston cocking rod. This structure reduces the operational effort required for use of the present cartridge to near zero as compared to the heretofore, required effort of:

(1) retracting a cocking rod against the force of the heavy barrel spring and locking it to the metal barrel end;
(2) unscrewing the barrel from the gun head which is often a slippery and difficult experience;
(3) removing the greasy spent cartridge from the metal barrel;
(4) uncapping the bottom end of a filled replacement cartridge;
(5) placing the open bottom end of the replacement cartridge into the barrel;
(6) removing the top metal cover of the cartridge;
(7) screwing the metal barrel into the gun head; and
(8) pushing the cocking rod back through the cartridge piston and locking the rod to the bottom barrel end.

It is particularly noted that the above multiplicity of steps are being done with the greasy cocking rod extending about a foot beyond and waving obtrusively about the bottom end of the barrel. The present invention eliminates this onerous procedure and in particular renders the grease gun user friendly. All that is required is to pick up the cartridge shown, e.g., in FIG. 3A and screwing its top into the mounting socket of the grease gun.

The invention will be further understood from the drawings herein the various figures are not necessarily drawn to scale or consistent proportions, and wherein.

DETAILED DESCRIPTION

By contrast to prior grease guns, in the present cartridge invention which can be used on any of the gun heads and grease pumping mechanisms presently available and/or as shown in the above noted patents, the present grease cartridge has no metal barrel, no spring urged piston, no piston cocking rod, and no grease pressurizing spring means for forcing the grease toward and through the inlet port and into the loading cylinder. With the present cartridge, the only force which is applied against the bottom end of the grease column within the present cartridge is air pressure provided by ambient air which is in communication with the bottom end of the grease column through one or more air bleed apertures or valving formed through wall portions of the cartridge at locations situated below the bottom end of the grease column and which enters into an ambient air chamber 40. Where the pumping mechanism of the grease gun does not provide adequate suction (not typical) in the loading cylinder to become self priming when using the present cartridge, a priming device such as the priming bulb shown, for example, in accompanying FIGS. 8-13 may be used to temporarily provide a small additional air pressure to the bottom of the grease column. It is noted that in the conventional off-the-shelf grease cartridges on the market, the bottom of the grease column does not extend to the bottom end of the cartridge such as to provide a lead-in portion of the cartridge wall for entry of the grease pressurizing piston which is mounted on the cocking rod. This lead-in portion provides space for the introduction of the present wiper disc and auxiliary primer and one-way valving structures.

Figure 3:
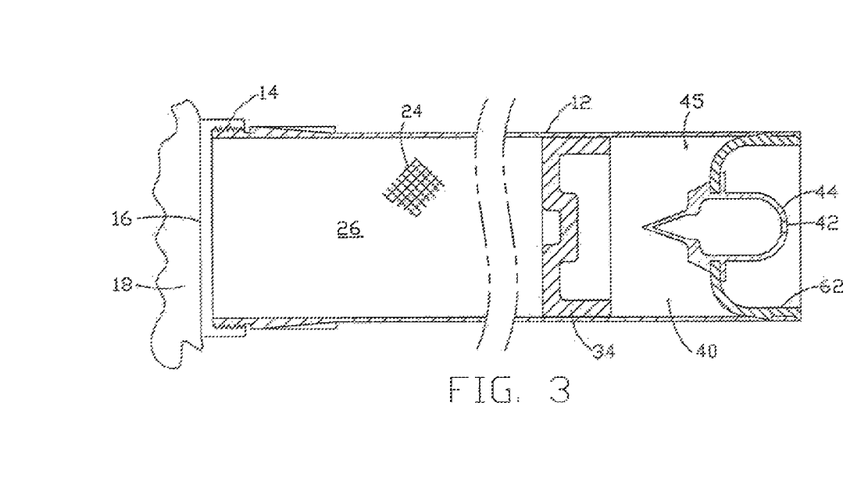
FIG. 3 is a longitudinal cross-sectional view taken alone line 3-3 in FIG. 1.
Figure 3A:
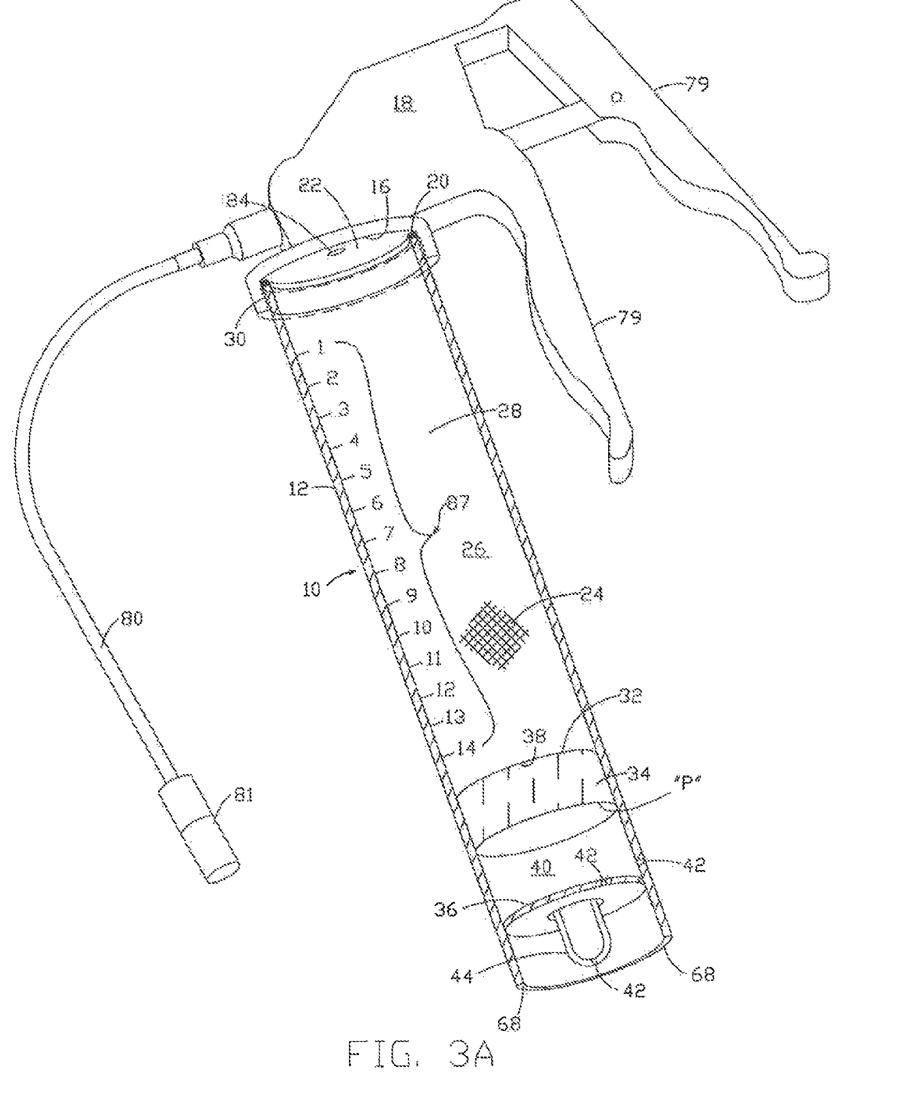
FIG. 3A is a perspective, partially cross-sectioned view of an assembly of the present non-collar cartridge of FIGS. 1-3 (having integrally molded mounting threads), and a conventional grease gun head.
Figure 4:
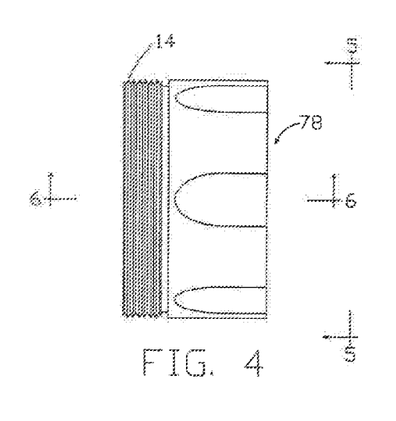
FIG. 4 is a side view of a cartridge mounting collar used on conventional grease cartridges.
Figure 5:
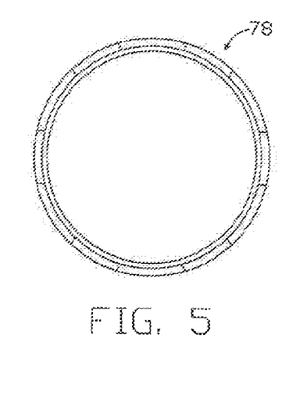
FIG. 5 is a proximal end view taken along line 5-5 in FIG. 4.
Figure 6:
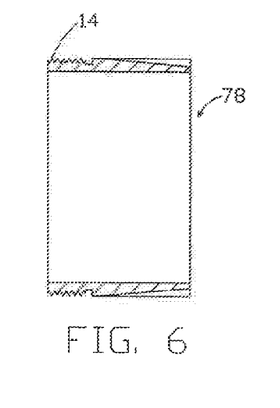
FIG. 6 is a cross-sectional view taken along line 6-6 in FIG. 4.
Figure 6A:
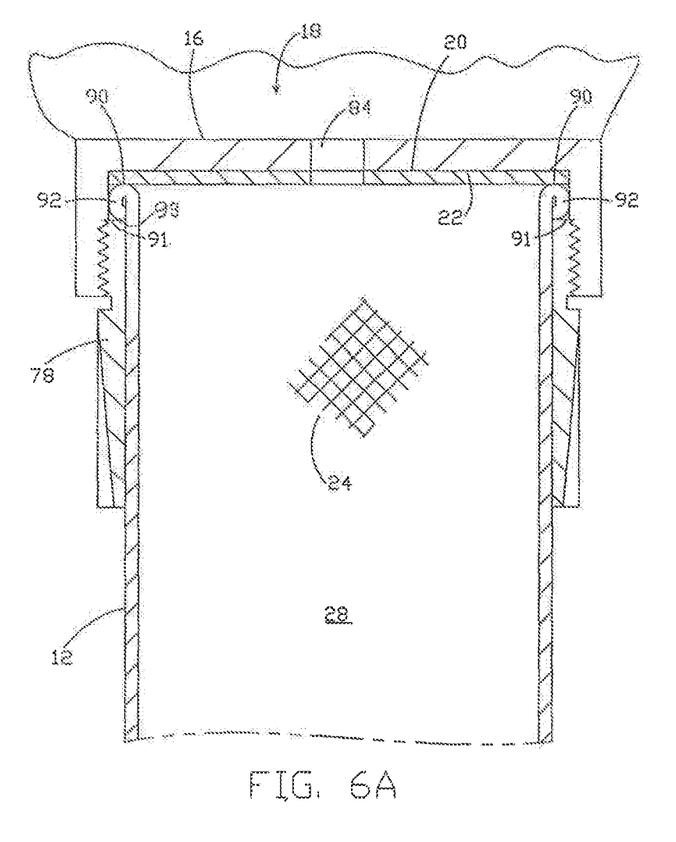
FIG. 6A is an enlarged cross-section of a collar type of cartridge-to-gun head mounting structure.
Figure 6B:
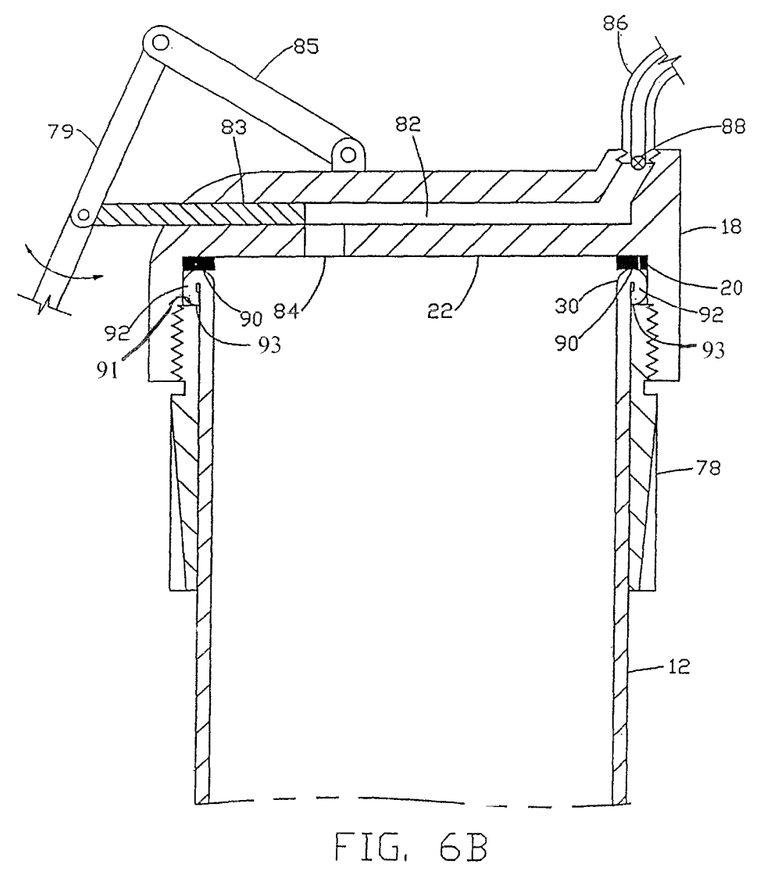
FIG. 6B is a view as in FIG. 6A and additionally showing a typical grease gun head and grease pumping system.
Figure 7:
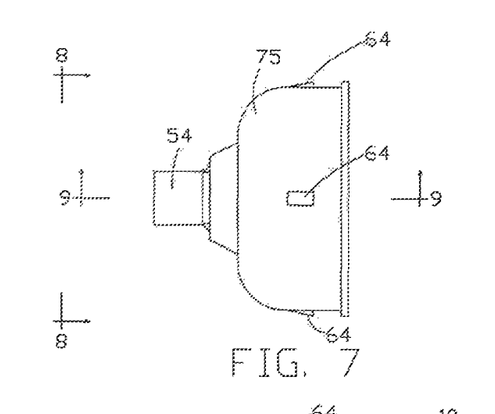
FIG. 7 is a side view of the primer bulb housing.

As shown in FIGS. 3A and 6B, the typical grease gun head 18 is provided with an annular mounting socket 16 the side wall of which is internally threaded for receiving the externally threaded end of a metal grease cartridge containing barrel (not shown). The present cartridge 10, preferably of molded plastic, is threaded at its distal upper end 30 for threading into the conventional mounting socket 16 and sealing against a sealing surface of the socket, which sealing surface, preferably, comprises an annular elastomeric gasket 20. Alternatively, the seal can be the elastomeric deformable distal (upper) distal end 30 of the cartridge wall itself sealing against the roof 22 of socket 16.

The grease guns having utility with the present invention include those as shown in FIGS. 6B and 3A, having the conventional structures of gun head 18, pump handles or lever 79, grease hose 80, ZERK fitting 81 and the like, and the grease pumping system having piston (loading) cylinder 82, piston 83, grease inlet port 84 to 82, handle or lever actuating linage 85, and grease outlet port 86 with one-way valving 88.

In the embodiment shown in FIGS. 4-6B, an annular collar 78 is dimensioned for a close sliding fit on the cylindrical cartridge wall 12 and is formed with an annular upper surface 91 for sealingly engaging the undersides 93 of the annular lip 92, formed, e.g., during molding or curling the distal (upper) end 30 of a fabricated or molded plastic cartridge and, by threading said end into the mounting socket and forcing the upper surface 90 of cartridge lip 92 into sealing engagement with the roof 22 or seal 20 of the mounting socket 16.

Figure 1:
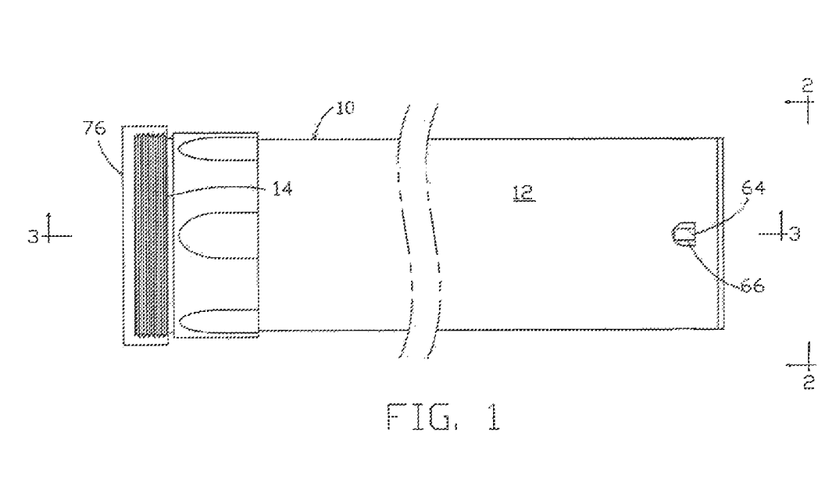
FIG. 1 is a side view of one preferred embodiment of the present non conventional cartridge wherein the mounting threads are integrally molded with the top of the cartridge wall.
Figure 2:
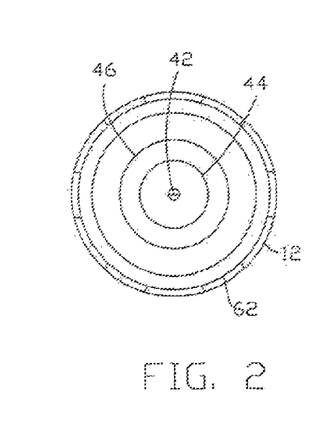
FIG. 2 is a proximal end view of the cartridge of FIG. 1 taken along line 2-2 in FIG. 1.

Referring to FIGS. 1-3 of the drawings the present cartridge 10 in a non-collar embodiment, is preferably, of molded industrial plastic material such as, polyolefin's, polyurethane, polyester, polyimide, polycarbonate or various copolymers, comprises a cylindrical wall 12 having a threaded top end 14 adapted to be screwed into a mounting socket 16 of a grease gun head 18 and preferably sealed against an annular elastomeric seal 20 fitted against the roof 22 of socket 16. Grease 24 initially fills cartridge chamber 26 to a desired level and forms a grease column 28 extending between the upper end 30 of the cartridge and the top 32 of a wiper disc 34 of slippery plastic material should such a disc be used. The wiper disc is not critical to the operation of the present cartridge but can assist in distributing the ambient air pressure "P" evenly against the bottom end surface 38 of the grease column. Also, the disc eliminates or at least minimizes any rogue grease migration which might occur down along the lower inner side portions of wall 12 and into the ambient air chamber 40. The air pressure in chamber 40 is maintained substantially constant by one or more air bleed ports 42 which can be provided in any portion of wall 12 which wall includes end cap portion 36, which portions below the bottom end surface 38 of the grease column 28. As shown in FIG. 1, a removable cap 76 is pushed or screwed down over the threaded end of the cartridge to contain the grease and to protect the threads at end 14 prior to use of the cartridge.

Figure 8:
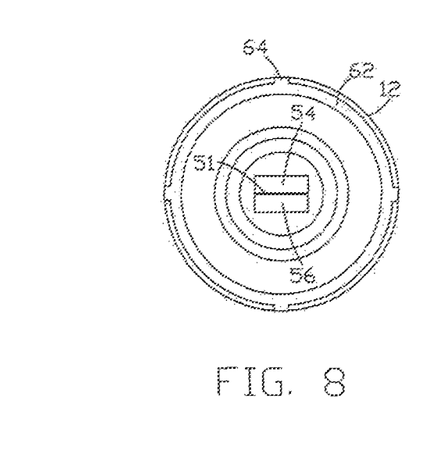
FIG. 8 is a distal end view taken along line 8-8 in FIG. 7.
Figure 8A:
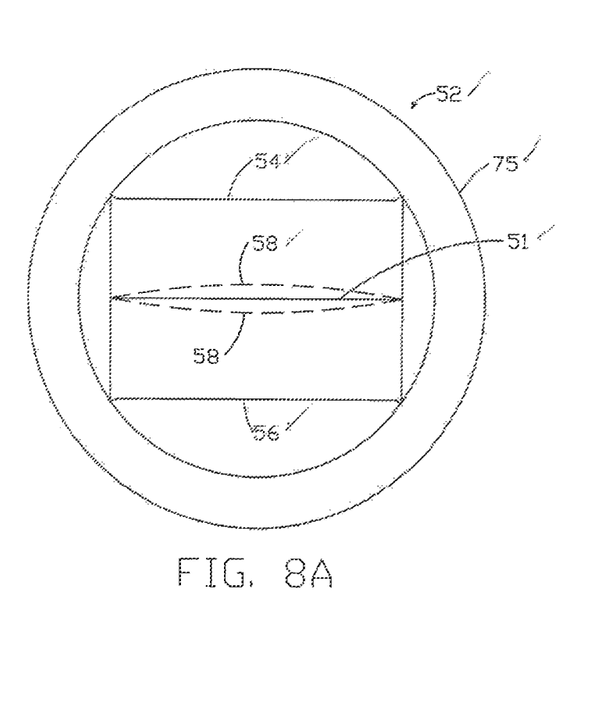
FIG. 8A is an enlarged view of FIG. 8.
Figure 9:
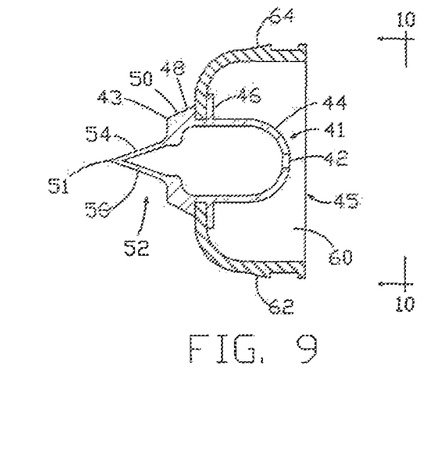
FIG. 9 is a cross-sectional view taken along line 9-9 in FIG. 7.
Figure 10:
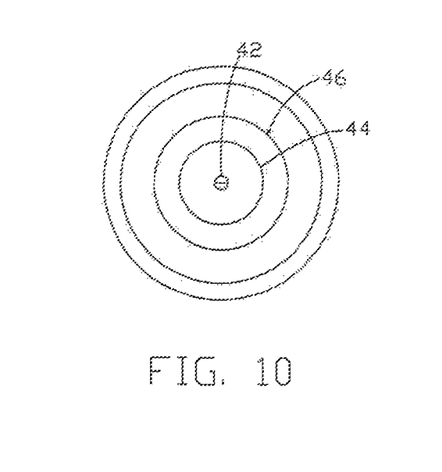
FIG. 10 is an end view taken along line 10-10 in FIG. 9.
Figure 11:
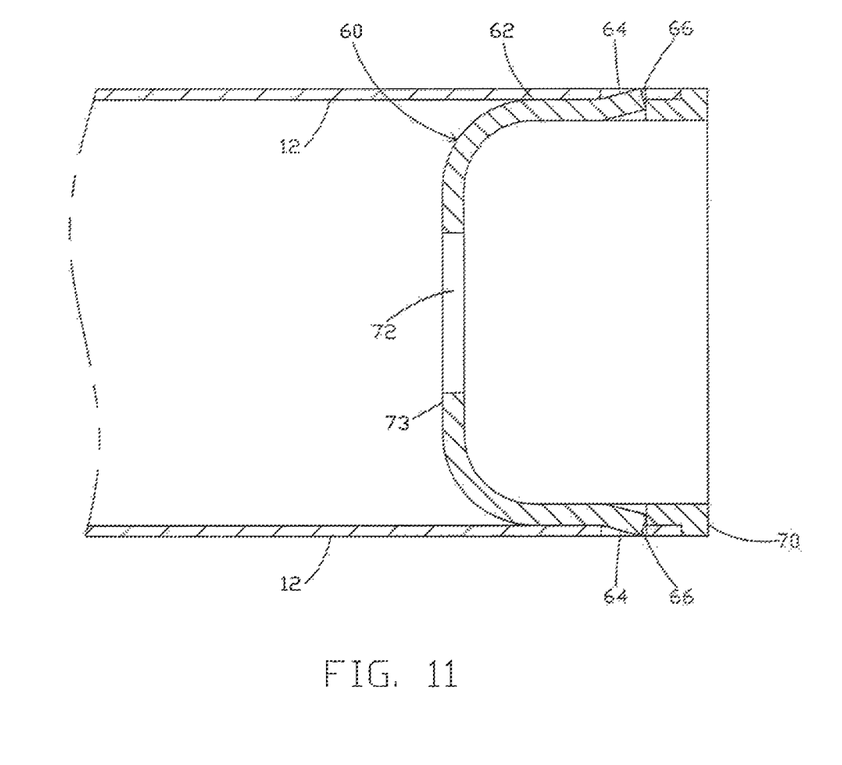
FIG. 11 is an enlarged cross-sectional view of the dotted (in FIG. 3) snap-in region of the primer structure into the cartridge bottom ends.
Figure 12:
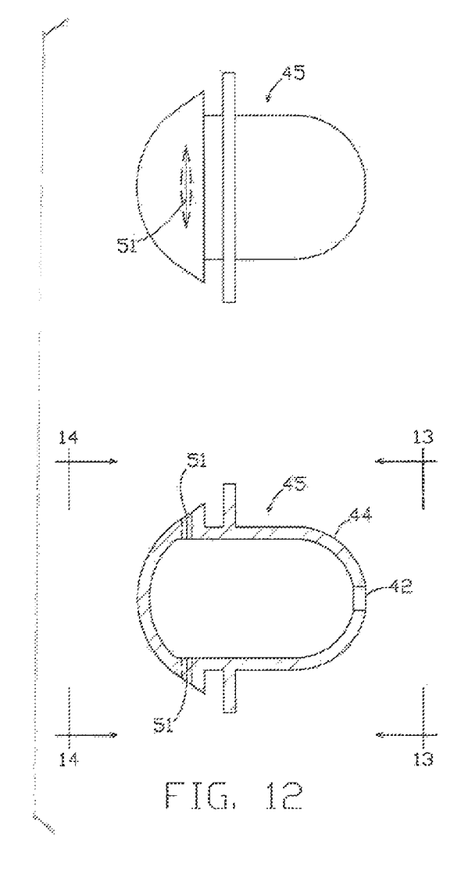
FIG. 12 is a longitudinal cross-section of a variation of the primer structure.
Figure 13:
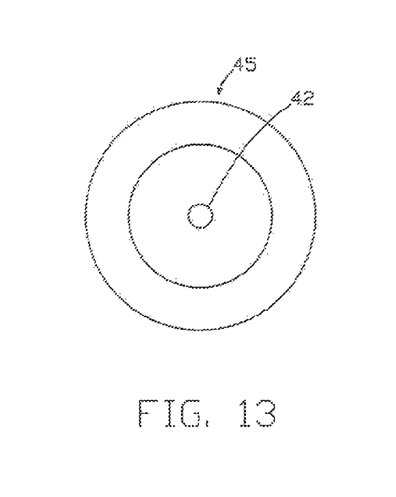
FIG. 13 is an end view taken along line 13-13 in FIG. 12.
Figure 14:
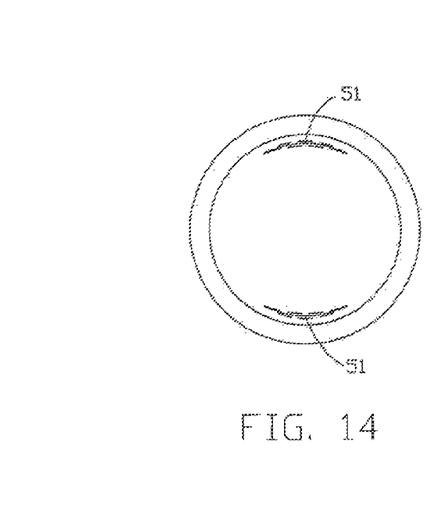
FIG. 14 is an end view taken along hug 14-14 in FIG. 12.
Figure 15:
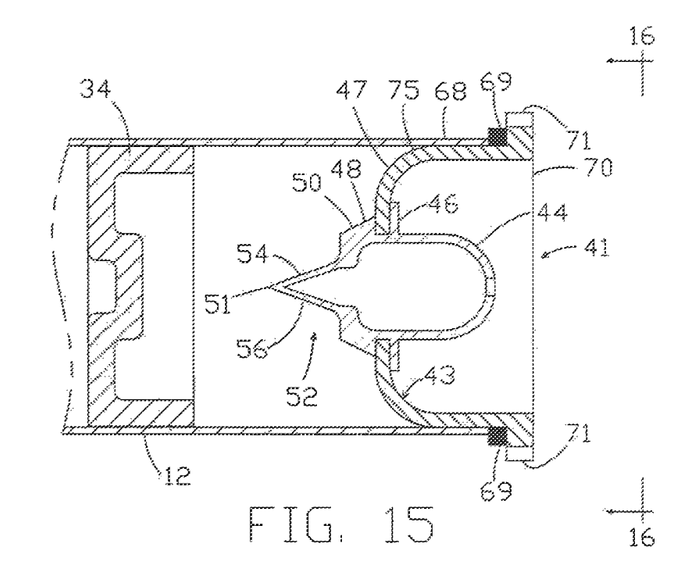
FIG. 15 is an alternative primer structure to that shown in FIGS. 1-3 wherein it is particularly useful with cartridges having irregularities such as longitudinal grooves in its inner wall surfaces.
Figure 16:
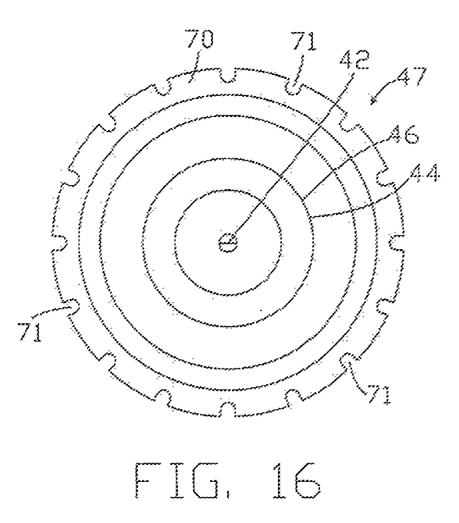
FIG. 16 is an end view taken along line 16-16 in FIG. 15.
Figure 17:
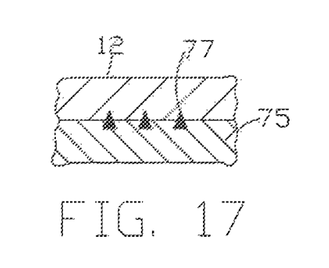
FIG. 17 is an enlarged view of dotted area "A" in FIG. 15.
Figure 18:
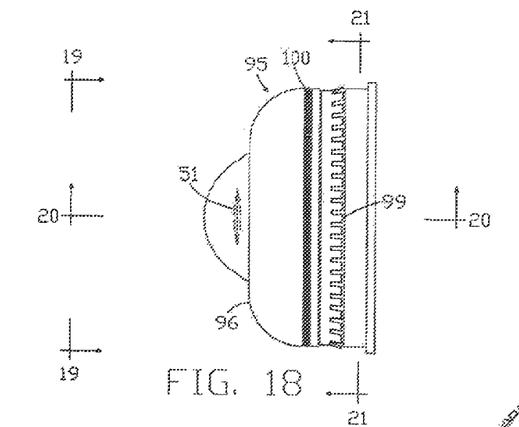
FIG. 18 is a side view of an alternative primer structure.
Figure 19:
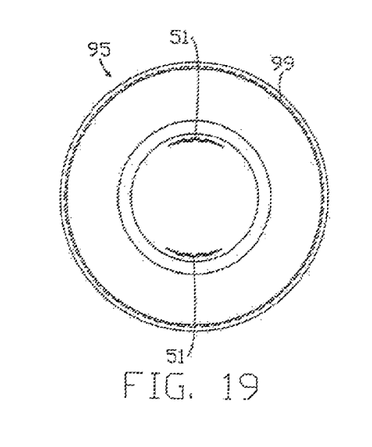
FIG. 19 is a view taken along line 19-19 in FIG. 18.

In a preferred embodiment of the use of a primer device, the air bleed port 42 is provided by way of a primer structure 45 having a primer housing 47 as shown in detail in FIGS. 9-11 15, 16 and 17 wherein a primer bulb section 41 comprises a body portion 43 having a resilient elastomeric squeeze bulb 44, a first annular stop shoulder 46 and a second annular stop shoulder 48 having an annular beveled lead-in surface 50. Said body portion 43 being formed with a one way valve section 52 comprising lips or flaps 54 and 56 which form slit 51 which is normally tightly, sealingly closed as shown e.g., in FIGS. 8 and 9, but which opens as shown by dotted line 58 in FIG. 8A upon squeezing bulb 44 to force air through slit 51. Primer structure 45 in FIGS. 8-11 further comprises a. mounting cap or body 60 having an annular snap on flange 62 having, e.g., 3-8 spurs 64 raised outwardly on its outer surface, wherein both the flange and the spurs will spring outwardly to nest the spurs into slots 66 in cartridge wall 12 upon flange 62 being forcibly pushed and flexed radially inwardly into the bottom end 68 of the cartridge wall wherein annular rim 70 on flange 62 will engage the bottom end 68 of cartridge wall 12 to properly position structure 45 within the cartridge.

Cap 60 (FIG. 11) is formed with a primer bulb mounting aperture 72 formed in wall 73 of the cap 60 and through which aperture the bulb section 41 is pushed (FIG. 9) to engage beveled leading edge surface 50 with aperture 72 edges to cam body portion 43 radially inward to snap and lock bulb section 41 into wall 73 between shoulders 46 and 48 of section 41.

It is noted that grease cartridge tubes presently on the market have on one end a removable, tear away metal top closure member which is provided with a finger pull tab for easy tear removal of the closure member. A removable cap is positioned over the bottom end of the cartridge. In using such off-the-shelf cartridges in accordance with the present invention, the bottom cap is removed and the alternative to FIGS. 1-3 if a primer is to be used, a primer housing 47 (FIGS. 15-17), is pushed up into the bottom end 68 of the cartridge against elastomeric seal 69 and then rotated slightly by finger grips 71, e.g., $\frac{1}{32}$ to $\frac{1}{8}$ of an inch to score wall 12 and lock the metal points 77 which are molded into the primer housing wall 75, into the cartridge wall 12. Where a primer is not used, the primer housing 47, without the primer bulb section 41 and one way valving section 52 is replaced with an ambient air bleed port 42. The cartridge wall 12 may be provided with any indicia such as grease level markings 87, manufactures notations, or grease type or the like.

Referring to FIGS. 19-22, a highly preferred embodiment of the primer/one way air valve 95 is shown wherein housing or end cap 96 is provided with an O-ring type seal 100 or an equivalent seal or a sealing compound which will prevent leakages of grease from the bottom end of the cartridge even though there might be irregularities in the inner surface of the cartridge wall which otherwise could form grease leakage channels. The mechanical properties of the seal should provide for conformation of the seal to the configuration of substantial irregularities.

Figure 20:
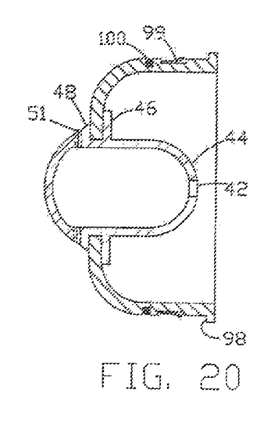
FIG. 20 is a cross-sectional view taken along line 20-20 in FIG. 18.
Figure 21:
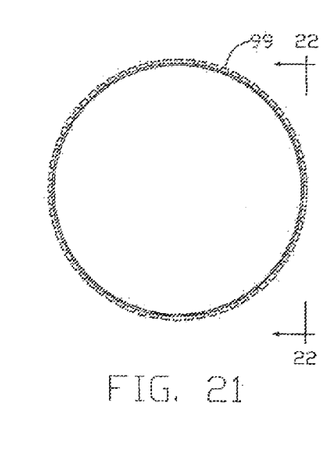
FIG. 21 is a view of the metal grip ring.
Figure 22:
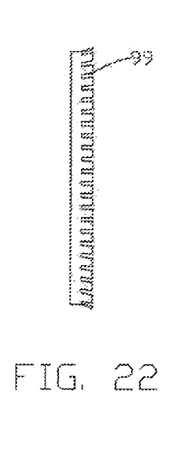
FIG. 22 is a side view of the grip ring of FIG. 21.

Further, housing 96 is provided with an annular grip ring which is formed with sharp edged gripping teeth 99 which will flex inwardly against the housing wall as the housing is being forced into the bottom end of the cylinder until it is stopped by engagement of annular rim 98 with the cartridge bottom end. At this point, the teeth ends will be in engagement with and will bite into the inner wall of the cartridge and prevent extraction of the housing from the cartridge. In assembling the ring onto the housing, the ring is forced over the air outlet end of the housing whereby the housing wall will resiliently flex radially inwardly sufficiently to allow the ring to slide into the annular groove as shown in FIG. 20.

The invention has been described in detail with particular reference to preferred embodiments thereof, but it will be understood that variations and modifications will be effected within the spirit and scope of the invention.

I claim:

1. A grease cartridge construction comprising a cylindrical tubular cartridge wall having:
    a top end portion which is closed off by a removable closure means and a closed bottom end portion and forming a grease reservoir chamber;
    thread means on an outer surface of the cylindrical tubular cartridge wall adjacent to said top end and adapted to be screwed into a threaded mounting socket of a grease gun head;
    a first removable closure means closing said top end of said wall;
    a column of grease in said chamber and having a lower end surface and an upper end surface, said lower end surface of said column being spaced above said closed bottom end of said wall to provide an ambient air chamber;
    a pumping means comprising a flexible, resilient bulb mounted on said bottom end portion of said cartridge wall, wherein an air inlet of said pumping means is in communication with the ambient atmosphere, and wherein an air outlet of said pumping means is in communication with said ambient air chamber, wherein said bulb is affixed to said bottom end portion of said cartridge wall which comprises a housing member containing said bulb, wherein the housing member itself is formed with a cylindrical side wall adapted to be tightly slid into a lower end portion of said cartridge wall; and
    an air vent structure in said bottom end portion of said wall which lies below said lower end surface of said column for allowing a controlled flow of ambient air into said ambient air chamber to form a positive pressure in said chamber relative to a suction pressure which would exist in a grease gun on its suction stroke.

2. The cartridge construction of claim 1 wherein said cartridge wall is comprised of formed plastic material and wherein a wiper disc is in place against the proximal end of said column of grease.

3. The cartridge construction of claim 2 wherein said air vent structure comprises an aperture formed through said bottom end portion of said cartridge wall.

4. The cartridge construction of claim 3 wherein said aperture is an air passage through a one way valve.

5. The cartridge construction of claim 1 wherein said pumping means further comprises a one-way air valve structure having a body portion affixed to a distal end of said housing member, and wherein said air outlet of said bulb is in communication with said one-way air valve structure.

6. The cartridge construction of claim 5 wherein said valve structure comprises an air passage formed through said body portion, which passage is normally closed by a pair of opposing resilient lips which form a slit which opens under air pressure generated by squeezing said bulb.

7. A grease gun having:
    a head section containing a grease pumping cylinder and piston mounted therein;
    a grease inlet port in said head section communicating with said cylinder;
    a grease outlet port in said head section communicating with a hose member affixed to said head;
    a grease cartridge affixed to said head section and comprising a cylindrical tubular cartridge wall having an open top end portion and a closed bottom end portion and forming a grease reservoir chamber;
    thread means on the outer surface of said wall adjacent to said top end and being screwed into a threaded mounting socket of said grease gun head section, whereby said inlet port is in communication with said chamber;
    a second closure means closing said bottom end of said wall;
    a column of grease in said chamber and having a lower end surface and an upper end surface, said lower end surface of said column being spaced above said closed bottom end of said cartridge wall to provide an ambient air chamber;
    an air pumping means comprising a flexible, resilient bulb mounted on said bottom end portion of said cartridge wall, wherein an air inlet of said pumping means is in communication with the ambient atmosphere, and wherein an air outlet of said pumping means is in communication with said ambient air chamber, wherein said bulb is affixed to said bottom end portion of said cartridge wall which comprises a separate housing member, wherein the housing member itself is formed with a cylindrical side wall adapted to be tightly slid into a lower end portion of said cartridge wall;
    an air vent structure in said bottom end portion of said wall which lies below said lower end surface of said column for allowing a controlled flow of ambient air into said ambient air chamber to form a positive pressure in said chamber relative to a suction pressure which would exist in said grease gun on its suction stroke.

8. The grease gun of claim 7 wherein said cartridge wall is comprise of formed plastic material a wiper disc is in place against the proximal end of said column of grease.

9. The cartridge construction of claim 8 wherein said air vent structure comprises an aperture formed through said bottom end portion of said cartridge wall.

10. The cartridge construction of claim 9 wherein said aperture is an air passage through a one way air valve.

11. The cartridge construction of claim 7, wherein said pumping means further comprises a one-way air valve structure having a body portion affixed to a distal side of said housing member, and wherein said air outlet of said bulb is in communication with said one-way air valve structure.

12. The cartridge construction of claim 11 wherein said valve structure comprises an air passage formed through said body portion, which passage is normally closed by a pair of opposing resilient lips which form a slit which opens under air pressure generated by sequeezing said bulb.

13. The cartridge construction of claim 12 wherein said air passage enters said body portion along a longitudinal axis of said body portion and along a coextensive longitudinal axis of said cartridge and exits said body portion at a substantially right angle to said longitudinal axes.

14. The cartridge construction of claim 6 wherein said side wall of said housing member is provided with an annular seal adapted to form a grease seal against the inner surface of said cartridge wall, and wherein said side wall of said housing member is provided with a plurality of flexible metal barbs which are affixed to the exterior surface of said side wall and extend outwardly therefrom at an acute angle toward said bottom end of said cartridge.

15. The cartridge construction of claim 14 wherein said barbs are portion of an annular rim which is nested in an annular groove in said side wall of said housing member.

\* \* \* \* \*